(12) United States Patent
Takeshita et al.

(10) Patent No.: US 9,179,053 B2
(45) Date of Patent: Nov. 3, 2015

(54) SOLID-STATE IMAGING APPARATUS AND METHOD OF PRODUCING A SOLID-STATE IMAGING APPARATUS

(71) Applicant: Panasonic Corporation, Kadoma-shi, Osaka (JP)

(72) Inventors: Takao Takeshita, Tokyo (JP); Hiroo Uchiyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 50 days.

(21) Appl. No.: 13/712,604

(22) Filed: Dec. 12, 2012

(65) Prior Publication Data

US 2013/0093948 A1     Apr. 18, 2013

Related U.S. Application Data

(63) Continuation of application No. PCT/JP2011/004745, filed on Aug. 25, 2011.

(30) Foreign Application Priority Data

Apr. 5, 2011 (JP) .................................. 2011-083679

(51) Int. Cl.
*H04N 5/225* (2006.01)
*G03B 17/02* (2006.01)

(52) U.S. Cl.
CPC .............. *H04N 5/2253* (2013.01); *G03B 17/02* (2013.01); *H04N 5/2257* (2013.01)

(58) Field of Classification Search
CPC ..... H04N 5/2253; H04N 5/2257; G03B 17/02
USPC .................................................. 348/373–376
See application file for complete search history.

(56) References Cited

U.S. PATENT DOCUMENTS

| | | | |
|---|---|---|---|
| 6,078,359 A * | 6/2000 | Conder ......................... | 348/374 |
| 6,122,009 A | 9/2000 | Ueda | |
| 7,362,372 B2 * | 4/2008 | Lyon et al. ..................... | 348/373 |
| 7,402,802 B1 | 7/2008 | Terre et al. | |
| 2002/0171153 A1 * | 11/2002 | Kikuchi et al. ............... | 257/778 |

(Continued)

FOREIGN PATENT DOCUMENTS

| | | |
|---|---|---|
| JP | 05-2482 | 1/1993 |
| JP | 5-2482 U | 1/1993 |

(Continued)

OTHER PUBLICATIONS

International Search Report issued in International Patent Application No. PCT/JP2011/004745 dated Sep. 20, 2011.

(Continued)

*Primary Examiner* — Roberto Velez
*Assistant Examiner* — Tuan Le
(74) *Attorney, Agent, or Firm* — McDermott Will & Emery LLP

(57) ABSTRACT

A solid-state imaging apparatus in which heat dissipation and electromagnetic shielding can be efficiently performed is provided.

The solid-state imaging apparatus includes: an MCM board 41 on which a sensor 42, and a SiP 44 that processes an output signal from the sensor 42 are mounted; a power supply board 61 on which a power supply IC 62 is mounted; and a shielding section 50 which is placed between the MCM board 41 and the power supply board 61 to cover the power supply IC 62, and which has an electrically conductive property and a thermally conductive property.

13 Claims, 9 Drawing Sheets

(56) References Cited

U.S. PATENT DOCUMENTS

| | | | |
|---|---|---|---|
| 2004/0064981 A1* | 4/2004 | Meidinger | 40/1 |
| 2005/0036778 A1* | 2/2005 | DeMonte | 396/89 |
| 2005/0250364 A1 | 11/2005 | Kameyama et al. | |
| 2005/0254140 A1* | 11/2005 | Sakamoto | 359/695 |
| 2006/0056049 A1* | 3/2006 | Tokiwa et al. | 359/684 |
| 2007/0000642 A1* | 1/2007 | Yamazaki et al. | 165/80.3 |
| 2010/0053388 A1* | 3/2010 | Kobayashi et al. | 348/294 |
| 2010/0296805 A1* | 11/2010 | Mayer | 396/155 |
| 2012/0026337 A1* | 2/2012 | Boulanger et al. | 348/164 |

FOREIGN PATENT DOCUMENTS

| | | |
|---|---|---|
| JP | 05-137037 A | 6/1993 |
| JP | 09-284617 A | 10/1997 |
| JP | 2004-048517 A | 2/2004 |
| JP | 2005-147822 A | 6/2005 |
| JP | 2005-322532 A | 11/2005 |
| JP | 2008-131251 A | 6/2008 |
| JP | 2008-211378 A | 9/2008 |
| JP | 2010-050771 A | 3/2010 |
| JP | 2010-154105 A | 7/2010 |

OTHER PUBLICATIONS

Extended European Search Report issued in European Application No. 11862867.6 dated Oct. 15, 2014.

* cited by examiner

LOW TEMPERATURE         HIGH TEMPERATURE

LOW TEMPERATURE  HIGH TEMPERATURE

LOW TEMPERATURE  HIGH TEMPERATURE

SOLID-STATE IMAGING APPARATUS AND METHOD OF PRODUCING A SOLID-STATE IMAGING APPARATUS

This application is a continuation of PCT application No. PCT/JP2011/004745, which was filed on Aug. 25, 2011 based on Japanese Patent Application (No. 2011-083679) filed on Apr. 5, 2011, the contents of which are incorporated herein by reference. Also, all the references cited herein are incorporated as a whole.

BACKGROUND OF THE INVENTION

1. Field of the Invention

The present invention relates to a solid-state imaging apparatus and a method of producing a solid-state imaging apparatus, and more particularly to a small solid-state imaging apparatus which is formed by using a solid-state imaging element, such as a surveillance camera, a medical camera, an on-vehicle camera, or a camera for an information communication terminal.

2. Description of the Related Art

Recently, the demand for miniature cameras is rapidly increasing in the fields of a portable telephone, an on-vehicle component, etc. In a miniature camera of this kind, used is a solid-state imaging apparatus in which an image that is supplied through an optical system such as a lens is output by a solid-state imaging element as an electrical signal. In accordance with advancement of miniaturization and higher performance of such a solid-state imaging apparatus, cameras are further miniaturized, their use in various fields is increased, and their market as a video input apparatus is expanding. In a conventional imaging apparatus using a semiconductor imaging element, components such as a lens, the semiconductor imaging element, and an LSI on which a driving circuit therefor, a signal processing circuit, and the like are mounted are formed into cases or structures, respectively, and they are combined with one another.

Moreover, recently, sophistication of a camera is advancing together with the miniaturization. When a camera is sophisticated, the amount of heat generation in components such as an LSI mounted in the camera is increased.

As an apparatus for suppressing such heat generation, an imaging apparatus in which heat generated by an imaging element can be dissipated to the outside of a case is known (for example, see Patent Reference 1). In the imaging apparatus, a first heat dissipating member which butts against a peripheral portion of a light-transmitting area of the imaging element and the inner surface of a shield case is disposed, and a second heat dissipating member which butts against the outer surface of the shield case and the inner surface of a case is disposed. Heat generated by the imaging element is conducted to the shield case through the first heat dissipating member, and further conducted to the case through the second heat dissipating member to be dissipated to the outside.

As another apparatus, known is an imaging apparatus module in which an accurate image can be obtained by reducing electrical interference between an imaging element and electronic components, and external connecting terminals, and heat can be efficiently dissipated through the external connecting terminals, and which can be mounted on a vehicle or like with high positional accuracy (for example, see Patent Reference 2). In the imaging apparatus module, it is easy that heat generated in a signal processing circuit board is conducted to a molding resin, and the heat is conducted through the resin to a lens holding member made of a metal material, and the heat can be dissipated from an exposed portion of the lens holding member to the outside.

Patent Reference 1: JP-A-2008-211378
Patent Reference 2: JP-A-2010-050771

SUMMARY OF THE INVENTION

In a conventional imaging apparatus, however, a lens is disposed in a direction along which heat is dissipated, and hence the heat is conducted along the case to raise the temperature of the lens. When a resin lens is used, therefore, there is a possibility that a surface coating may crack and the image quality may be caused to be lowered.

In a conventional imaging apparatus, moreover, the temperature of a sensor (imaging element) or an image processing chip is raised by heat generation during driving of a camera. Therefore, there is a possibility that noises may be generated in a taken video to lower the image quality, or that thermal strain may be accumulated in a joining portion as a result of a long-term use and the joining portion may be damaged to cause disjoining.

Furthermore, an imaging apparatus includes a power supplying circuit for supplying an electric power to various circuits in the imaging apparatus. The power supplying circuit generates many electromagnetic waves. When electromagnetic waves reach the circuits, there is a case where the circuits malfunction. In order to prevent this from occurring, it is effective to dispose a member for electromagnetic shielding in the power supplying circuit. However, the disposition of an electromagnetic shielding member sometimes impedes miniaturization of an imaging apparatus.

The invention has been conducted in view of the above-discussed circumstances. It is an object of the invention to provide a solid-state imaging apparatus in which heat dissipation and electromagnetic shielding can be efficiently performed, and a method of producing the solid-state imaging apparatus.

The solid-state imaging apparatus of the invention includes: a first board on which a solid-state imaging element, and a signal processing circuit section that processes an output signal from the solid-state imaging element are mounted; a second board on which a power supplying circuit section is mounted; and a heat dissipation plate which is placed between the first board and the second board to cover the power supplying circuit section, and which has an electrically conductive property and a thermally conductive property.

According to the configuration, heat dissipation and electromagnetic shielding can be efficiently performed. Namely, heat dissipation from electronic components on the first board and those on the second board, and electromagnetic shielding to the electronic components on the first board and those on the second board can be simultaneously realized.

In the solid-state imaging apparatus of the invention, moreover, the heat dissipation plate may be thermally in contact with the signal processing circuit section mounted on the first board or the power supplying circuit section mounted on the second board.

According to the configuration, heat dissipation from the signal processing circuit section or signal processing circuit section in which the amount of heat generation is large can be efficiently performed.

The solid-state imaging apparatus of the invention may further include a case which houses the first board and the second board, and the heat dissipation plate is thermally in contact with the case.

According to the configuration, heat can be conducted from the heat dissipation plate to the case to be dissipated.

In the solid-state imaging apparatus of the invention, moreover, the case may be configured by a first case which houses the first board, and a second case which houses the second board, and the heat dissipation plate is sandwiched between the first case and the second case.

According to the configuration, the sandwiching between the first case and the second case is attained, and positive contacts with the cases are made to improve the thermally conductive property. Therefore, the heat dissipation property is improved.

In the solid-state imaging apparatus of the invention, moreover, an end portion of the heat dissipation plate may elastically butt against the case.

According to the configuration, the elasticity causes a part of the heat dissipation plate to butt against the case, whereby heat dissipation can be efficiently performed. Furthermore, the heat dissipation plate and the case can be fixed to each other without using a fastening members, and therefore assembling can be easily done while reducing the number of components.

In the solid-state imaging apparatus of the invention, moreover, a lens unit which holds the lens is fixed to the first board, and in contact with the case, and a coefficient of thermal conductivity of the heat dissipation plate may be higher than a coefficient of thermal conductivity of the lens unit.

According to the configuration, a lens crack which may be caused by conducting heat generated in the signal processing circuit section to the lens through the first board and the lens unit or the heat dissipation plate, the case, and the lens unit can be prevented from occurring.

In the solid-state imaging apparatus of the invention, moreover, the heat dissipation plate may be formed by a metal plate.

According to the configuration, the thermally conductive property of the heat dissipation plate is improved, and heat dissipation can be efficiently performed.

In the solid-state imaging apparatus of the invention, moreover, the heat dissipation plate may be formed by a graphite sheet.

According to the configuration, the thermally conductive property of the heat dissipation plate is improved, and heat dissipation can be efficiently performed.

Moreover, the method of producing a solid-state imaging apparatus of the invention includes the steps of: mounting a solid-state imaging element, and a signal processing circuit section that processes an output signal from the solid-state imaging element, on a first board; mounting a power supplying circuit section on a second board; placing a heat dissipation plate which has an electrically conductive property and a thermally conductive property, between the first board and the second board, to cover the power supplying circuit section; housing the first board and the second board in a case; and ultrasonic welding an end portion of the heat dissipation plate with the case.

According to the production method, it is possible to produce a solid-state imaging apparatus in which heat dissipation and electromagnetic shielding can be efficiently performed. Moreover, the heat dissipation plate and the case are caused to butt against each other without using a fastening member. Therefore, a solid-state imaging apparatus can be easily assembled.

According to the invention, heat dissipation and electromagnetic shielding can be efficiently performed.

DESCRIPTION OF THE PREFERRED EMBODIMENTS

Hereinafter, embodiments of the invention will be described in detail with reference to the drawings.

First Embodiment

Figure 1:
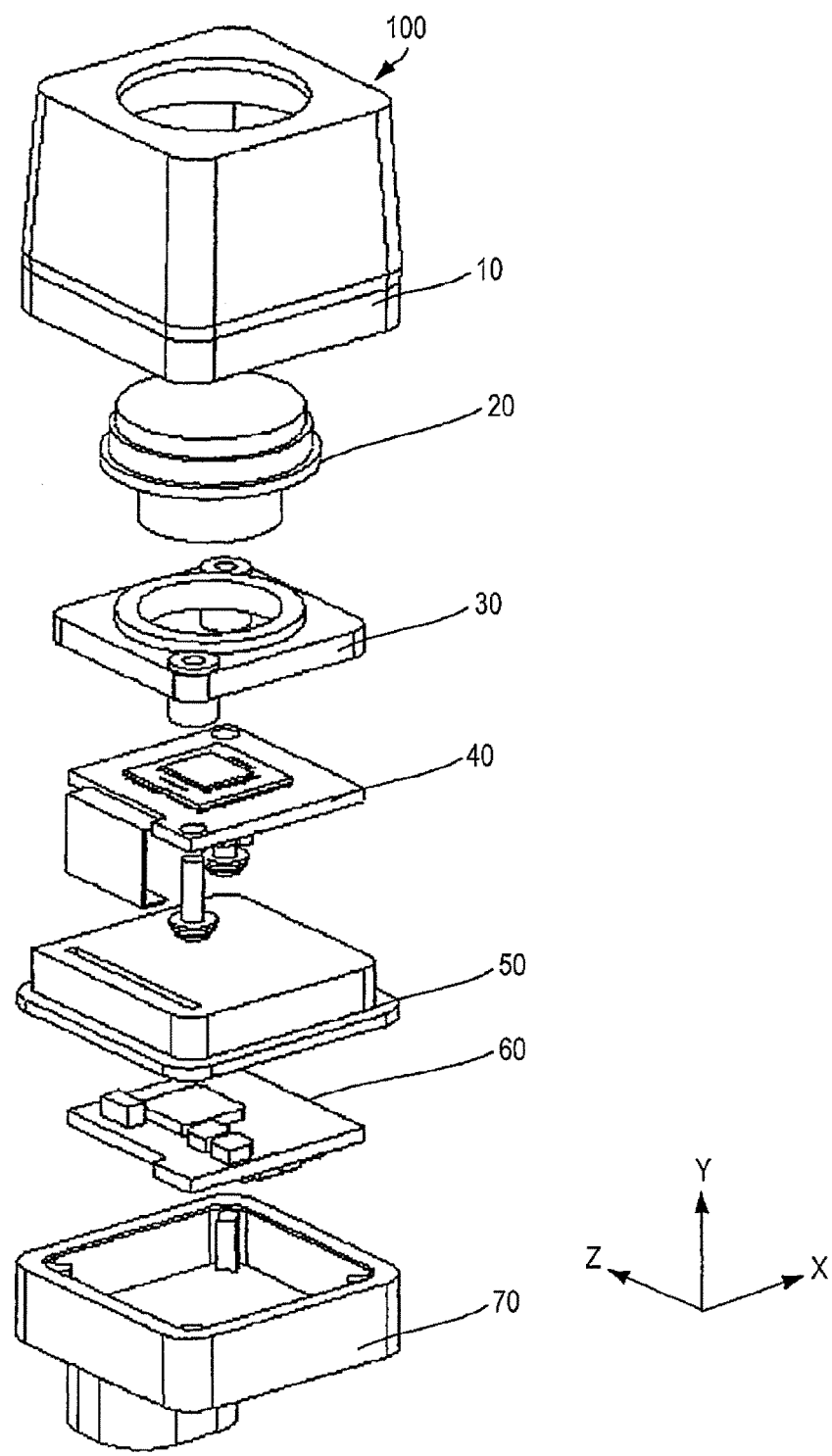
FIG. 1 shows an exploded perspective view of an example of a solid-state imaging apparatus of a first embodiment of the invention.
Figure 2:
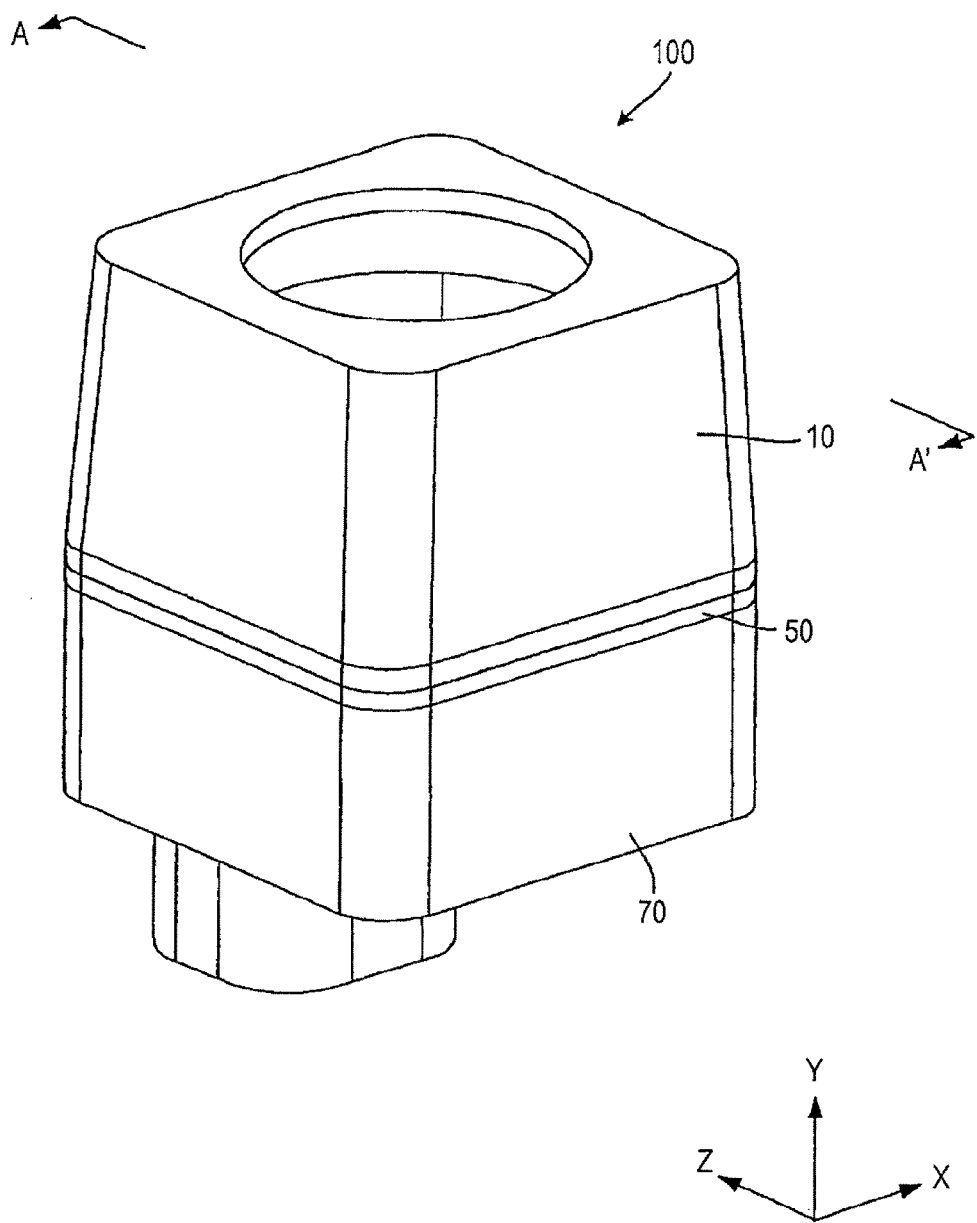
FIG. 2 shows an external perspective view of the solid-state imaging apparatus of the first embodiment of the invention.
Figure 3:
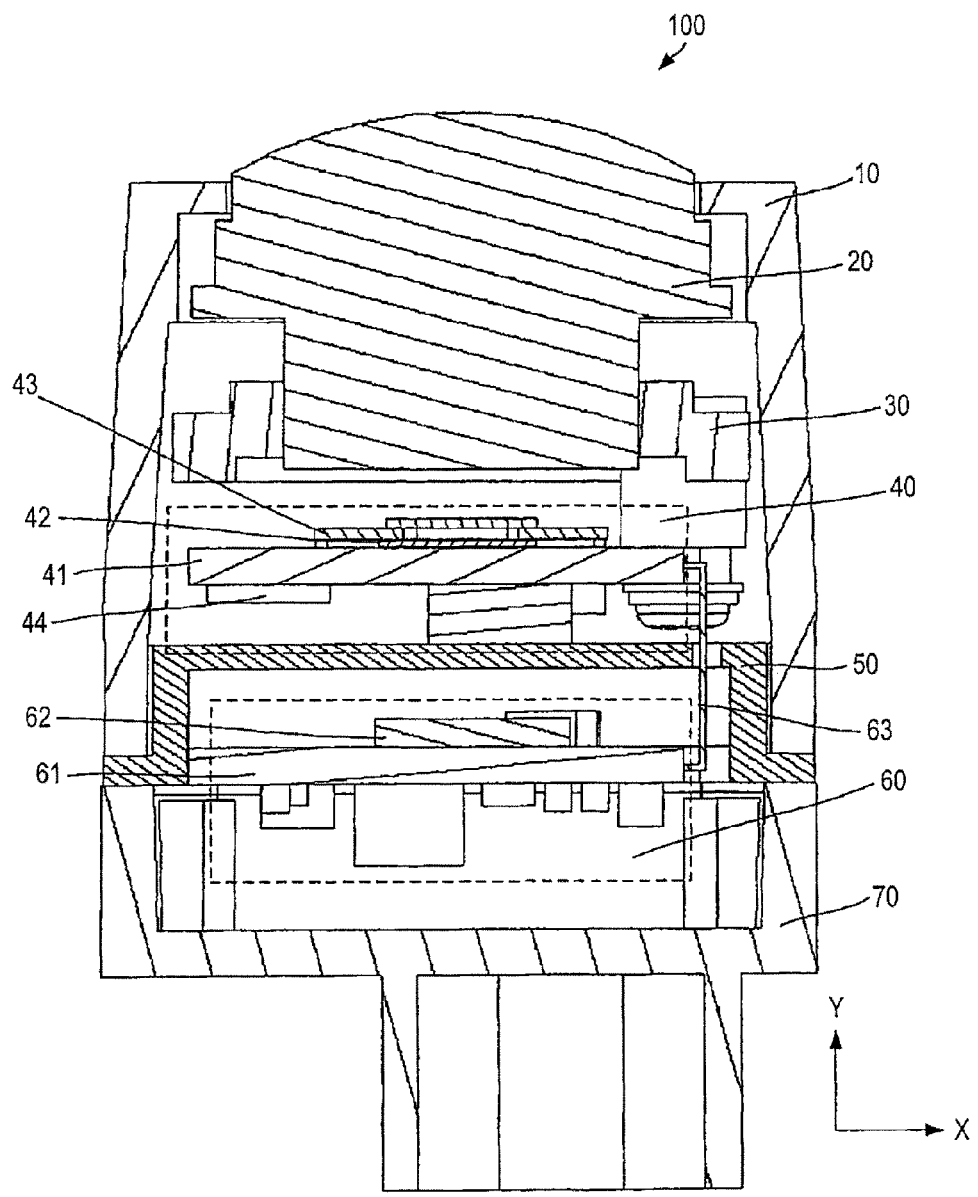
FIG. 3 shows an A-A' sectional view of the solid-state imaging apparatus of the first embodiment of the invention in which components are combined together.

FIG. 1 shows an exploded perspective view of an on-vehicle camera of the embodiment. Moreover, FIG. 2 shows an external perspective view of a state where a solid-state imaging apparatus of the embodiment is combined. Furthermore, FIG. 3 shows an A-A' sectional view of the solid-state imaging apparatus of the embodiment in which components are combined together.

The on-vehicle camera 100 shown in FIG. 1 has a first case 10, a lens unit 20, a lens bracket 30, an imaging module 40, a shielding section 50, a power supply module 60, and a second case 70. The on-vehicle camera 100 is mounted on, for example, a rear portion of a vehicle, and attached so as to be able to monitor of the rear of the vehicle in a parking operation. Although an on-vehicle camera is exemplified as a camera unit, various other camera units such as a surveillance camera, a medical camera, and a camera for an information communication terminal may be used.

The first case 10 and the second case 70 are combined with each other to accommodate the lens unit 20, the lens bracket 30, the imaging module 40, the shielding section 50, and the power supply module 60, thereby protecting various electronic components mounted on the imaging module 40 and the power supply module 60.

As the material of the first case 10 and the second case 70, a resin or a metal such as aluminum is used. When a material having a high thermally conductive property is used, the heat dissipation property is improved. The coefficient of thermal conductivity may be improved by mixing a metal filler in the first case 10 and the second case 70. This causes the heat dissipation property to the outside of the on-vehicle camera 100 to be enhanced. Therefore, temperature rises of the lens, a sensor 42 (see FIG. 3), a SiP 44 (see FIG. 3) including an ISP functioning as an image processing chip, and the like are suppressed, and a lens crack can be prevented from occurring.

Moreover, a first sealing packing (not shown) is disposed in the first case 10, and a second sealing packing (not shown) is disposed in the second case 70. This improves the hermetic seal property in the case where the components 20 to 60 are housed in the case, and the water-proof property and the dust-proof property can be ensured.

A lens is disposed in the lens unit 20. The lens may be configured by various materials such as glass, a heat-resistant plastic resin, and a low-heat-resistant plastic resin. The lens unit 20 is fixed by the lens bracket 30 which is made of a plastic resin or a metal, with using fastening members such as screws to a first surface of an MCM (Multi Chip Module) board 41 of the imaging module 40. Moreover, the lens unit 20 is configured by, for example, a polyamide resin.

The imaging module 40 has the MOM board 41 on which various electronic components are mounted. A sensor board (imaging element board) 43 on which the sensor (imaging element) 42 such as a CCD image sensor serving as a solid-state imaging element is mounted is disposed on the first surface (in the embodiment, the surface on the side of the lens unit 20) of the MCM board 41. The SiP (System in Package) 44 serving as a signal processing circuit section that performs a process on an output signal from the solid-state imaging element, and the like is disposed on a second surface (in the embodiment, the surface on the side of the power supply module 60) of the MCM board 41. Although not shown in detail, the SiP 44 has: an ISP (Image Signal Processor) which is an image processing DSP for processing an image signal supplied from the sensor 42; a flash ROM; electronic components for communication, such as a CAN microcomputer and a CAN transceiver; electronic components for control; and other electronic components. The on-vehicle camera 100 of the embodiment is a sophisticated camera in which a person detecting function and the like are enabled, the throughput of the SiP 44 is large, and hence also the amount of heat generation is large.

The power supply module 60 has a power supply board 61. A power supply IC 62 serving as a power supplying circuit section is mounted on a first surface (in the embodiment, the surface on the side of the imaging module 40) of the power supply board 61. The power supply IC 62 supplies an electric power to electronic components in the on-vehicle camera 100, such as the imaging module 40. The power supply IC 62 may be mounted also on a second surface which is opposite to the first surface of the power supply board 61. Moreover, various electronic components (for example, capacitors, and connectors for supplying signals to the vehicle) are placed on the second surface (in the embodiment, the surface on the side of the second case 70) of the power supply board 61. The imaging module 40 and the power supply module 60 are electrically connected to each other by a connection component 63 such as a connector, a flexible board, or the like.

The power supply IC 62 performs the electric power supply, therefore generates a large amount of heat, and functions also as a source of generating electromagnetic waves.

Although not shown, one end of a cable is connected through the second case 70 to the imaging module 40 and the power supply module 60, and the other end is connected to the vehicle on which the on-vehicle camera 100 is mounted. The cable is used for transmitting various signals such as an image signal and supplying the electric power. The vehicle side to which the on-vehicle camera 100 is to be attached is the side of the second case 70 (the lower side in FIG. 3).

The shielding section 50 is a heat dissipation plate which is placed between the imaging module 40 and the power supply module 60 so as to cover the power supply module 60, and which has an electrically conductive property and a thermally conductive property. The shielding section 50 is configured by a metal plate, a graphite sheet, a resin having a high thermally conductive property, or the like. As a metal plate, aluminum, copper, a member in which a metal foil is applied to an insulating board, or the like may be used.

The shielding section 50 is sandwiched between the imaging module 40 and the power supply module 60, and thermally in contact with at least one side of the electronic components placed on the second surface of the imaging module 40, such as the SiP 44, and those placed on the first surface of the power supply module 60, such as the power supply IC 62. When the on-vehicle camera 100 is combined, the shielding section 50 is thermally in contact with the first case 10 and the second case 70, whereby heat is dissipated to the outside of the on-vehicle camera 100 through the first case 10 and the second case 70.

When the heat dissipation property due to the shielding section 50 alone is sufficient, the shielding section 50 is not required to be thermally in contact with the first case 10 and the second case 70. In the case where the shielding section 50 is laminated with a graphite sheet configured by carbon having a high thermally conductive property, for example, the shielding section 50 which is thick can be formed, and a sufficient heat dissipation property can be ensured.

In the case where the shielding section 50 is made of a resin, a metal filler is mixed in the resin so as to further improve the heat dissipation property.

Moreover, a part of the electronic components included in the SiP 44 disposed on the second surface of the imaging module 10 may be mounted on the power supply module 60, but preferably may be mounted on the imaging module 40 which is separated by a short distance from the sensor 42. In the case where signal processing components are mounted on the power supply module 60, the components are placed on the first surface of the power supply module 60 in order to enable the components to be thermally in contact with the shielding section 50.

There is a gap between the MCM board 41 and the sensor 42. The gap may be filled with an underfill. This causes the MCM board 41 and the sensor 42 to be integrated with each other, and hence also the heat dissipation efficiency with respect to heat generation in the periphery of the sensor 42 can be improved. When comparing the MCM board 41 with the sensor 42, the MCM board 41 is larger in heat capacity than the sensor 42. In the embodiment, heat dissipation is conducted from the rear surface (second surface) of the MCM board 41, and therefore the heat dissipation efficiency is excellent.

Moreover, the coefficient of thermal conductivity of the shielding section 50 is higher than that of the lens unit 20. Specifically, in the case where the shielding section 50 is made of aluminum, the coefficient of thermal conductivity is about 235 (W/mK), and, in the case where the shielding section 50 is made of copper, the coefficient of thermal conductivity is about 400 (W/mK). By contrast, in the case where the lens unit 20 is made of a polyimide resin, the coefficient of thermal conductivity is about 0.2 (W/mK). Therefore, heat generated by the electronic components on the MCM board is mainly conducted not to the lens unit 20 but to the shielding section 50. Consequently, a lens crack which may be caused by conducting heat from the lens unit to the lens can be prevented from occurring.

As described above, in the configuration where heat dissipation is performed by the shielding section 50 alone, or that where the shielding section 50 is placed between the two boards (the MCM board 41 and the power supply board 61) and heat is dissipated from the shielding section 50 to the outside of the on-vehicle camera 100 through the first case 10 and the second case 70, the heat conducting path is shortened, and the heat dissipation property is improved. Particularly, heat can be efficiently dissipated from the electronic components included in the SiP 44 which generates a large amount of heat, and the ISP and the sensor 42 can be prevented from malfunctioning. Moreover, the lens is not included in the heat conducting path, and hence a crack in the lens can be prevented from occurring.

Furthermore, the power supply IC 62 is designed on the premise that it generates heat, and it is often that the guarantee temperature is previously set to be slightly high. When heat is dissipated from the power supply IC, the temperature of the whole on-vehicle camera 100 can be lowered, and the electronic components mounted on the on-vehicle camera 100 can be prevented from malfunctioning.

Moreover, in order to prevent malfunctioning of the sensor 42 and the like, it is preferred that the power supply module 60 is electromagnetically shielded. When the shielding section 50 is disposed, the electromagnetic shielding and the thermal shielding can be performed by one component, and the number of components can be reduced.

Next, results of simulation of the temperature distribution in the on-vehicle camera 100 will be described.

Figure 4:
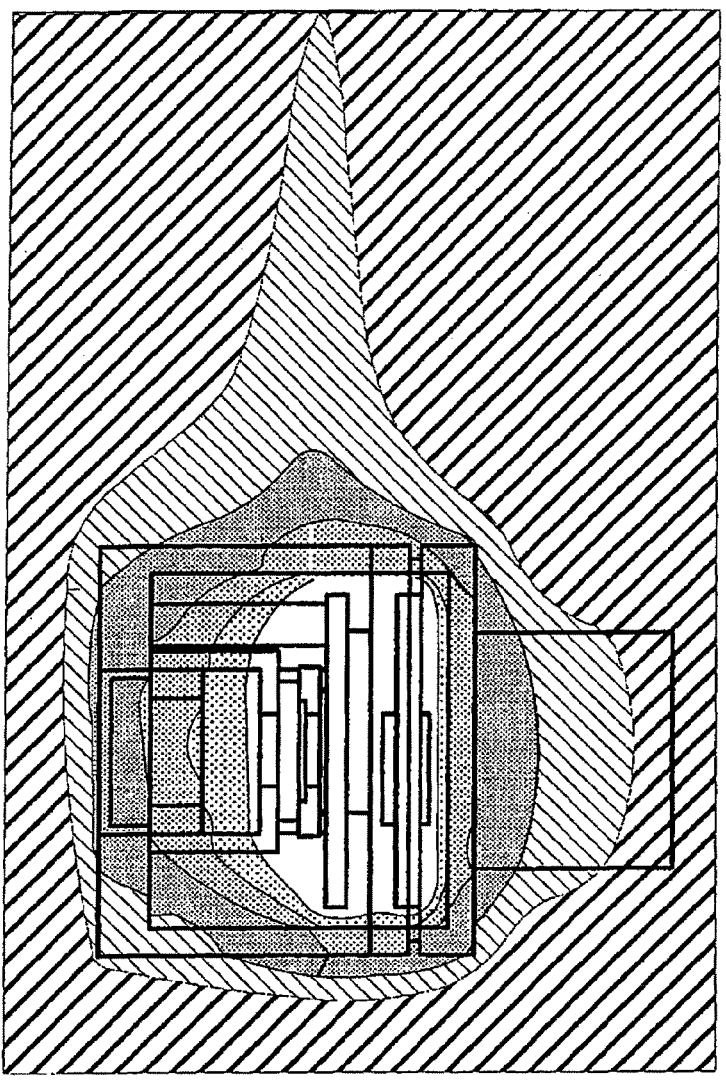
FIG. 4 shows a simulation diagram showing the temperature distribution in a solid-state imaging apparatus in the case where the solid-state imaging apparatus does not have a heat dissipation plate.
Figure 4:
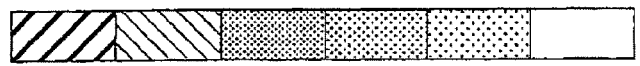
Figure 4:
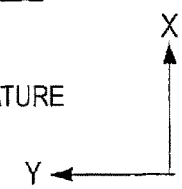
Figure 5:
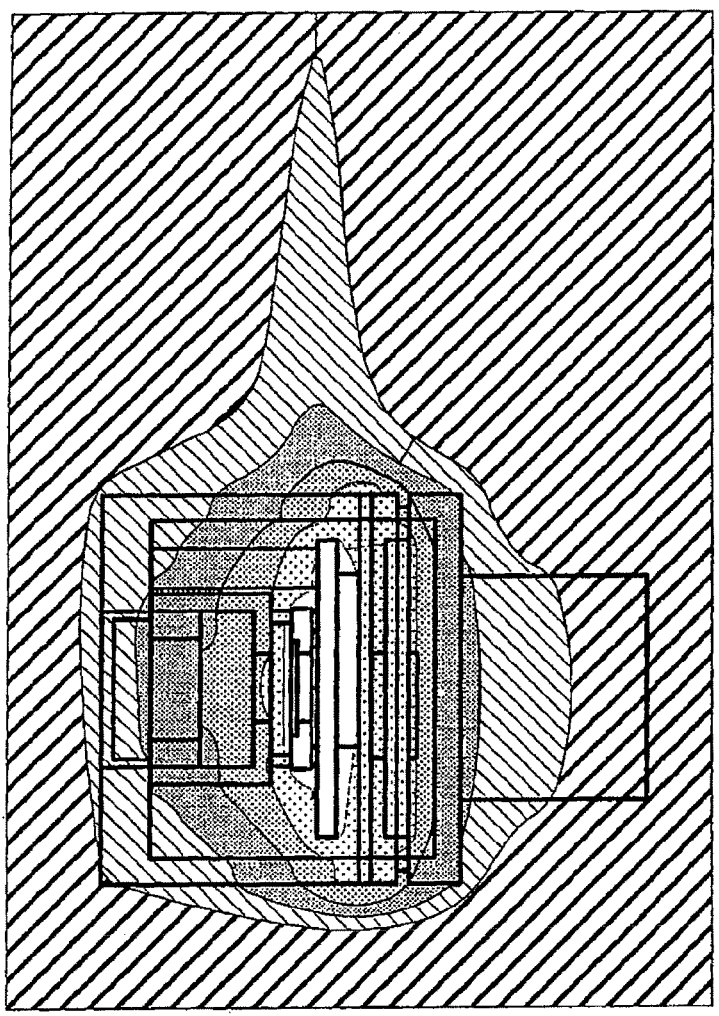
FIG. 5 shows a simulation diagram showing the temperature distribution in the solid-state imaging apparatus of the first embodiment of the invention in the case where the solid-state imaging apparatus has a heat dissipation plate, and a second case is formed by a resin.
Figure 5:
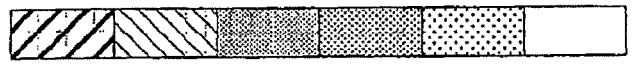
Figure 5:
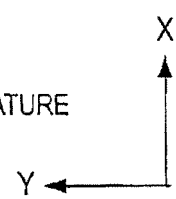
Figure 6:
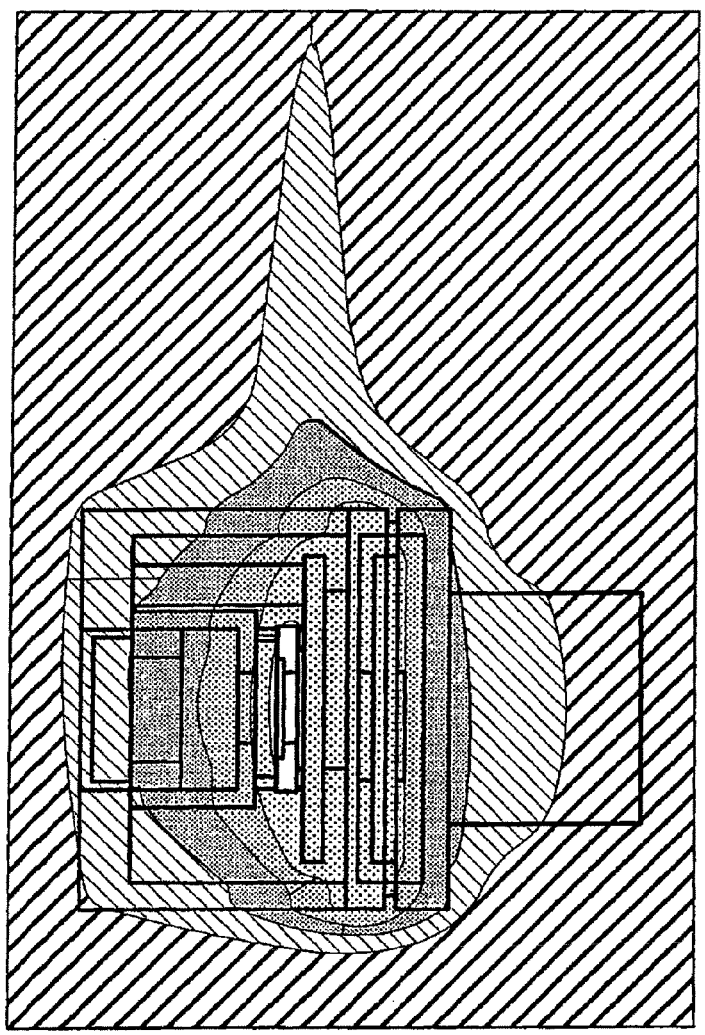
FIG. 6 shows a simulation diagram showing the temperature distribution in the solid-state imaging apparatus of the first embodiment of the invention in the case where the solid-state imaging apparatus has a heat dissipation plate, and the second case is formed by aluminum.
Figure 6:
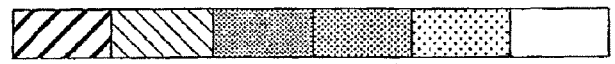
Figure 6:
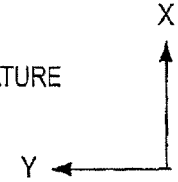

FIG. 4 shows a simulation diagram showing the temperature distribution in the on-vehicle camera 100 in the case where the on-vehicle camera 100 is assumed not to have the shielding section 50. FIG. 5 shows a simulation diagram showing the temperature distribution in the on-vehicle camera 100 in the case where the on-vehicle camera 100 has the shielding section 50, and the second case 70 is formed by a resin (mainly, PC (polycarbonate)). FIG. 6 shows a simulation diagram showing the temperature distribution in the on-vehicle camera 100 in the case where the on-vehicle camera 100 has the shielding section 50, and the second case 70 is formed by aluminum. The simulation diagrams of FIGS. 4 to 6 show temperature rises during the operation of the on-vehicle camera 100, respectively.

When the temperature rise of the MCM board 41 in the on-vehicle camera 100 shown in FIG. 4 is set as the reference, the temperature rise of the MCM board 41 in the on-vehicle camera 100 shown in FIG. 5 is suppressed by about 34%. Similarly, when the temperature rise of the MCM board 41 in the on-vehicle camera 100 shown in FIG. 4 is set as the reference, the temperature rise of the MCM board 41 in the on-vehicle camera 100 shown in FIG. 6 is suppressed by about 54%.

Figure 7:
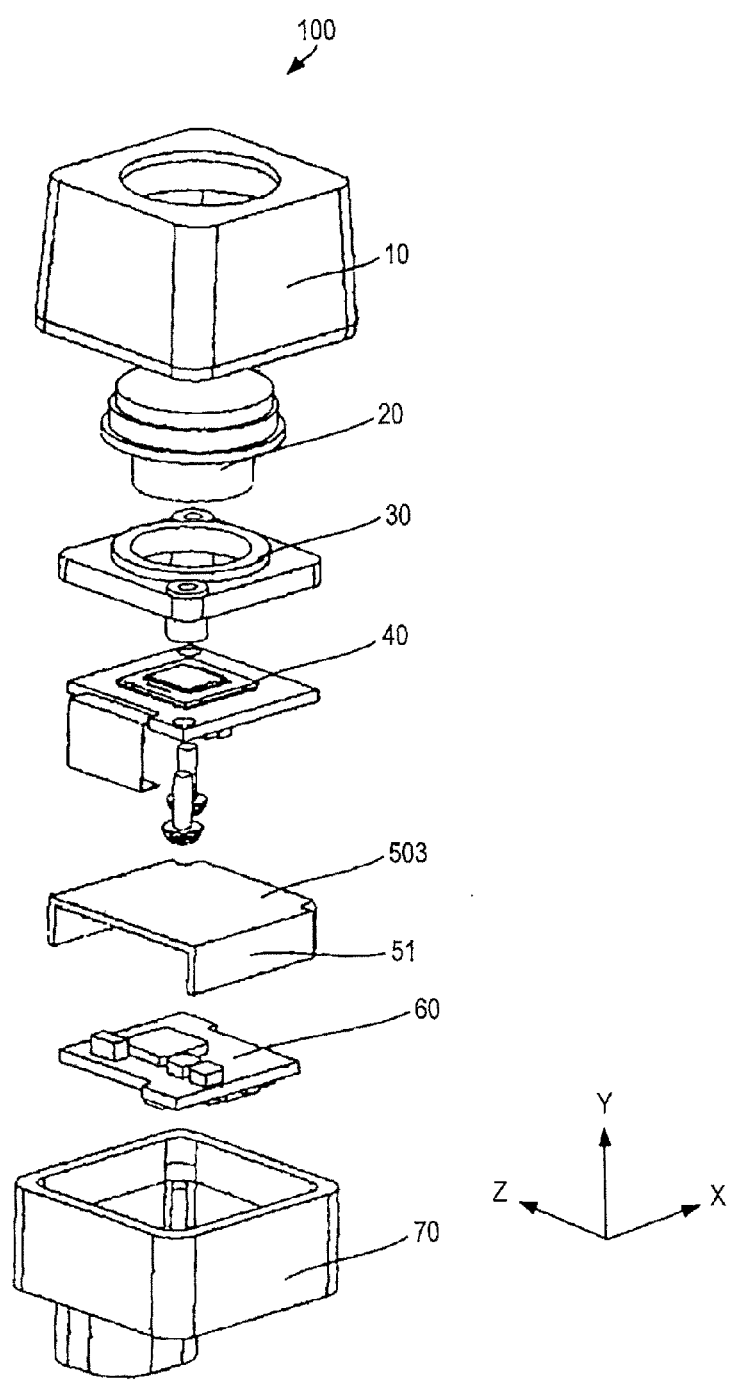
FIG. 7 shows an exploded perspective view of an example of a solid-state imaging apparatus of a second embodiment of the invention.
Figure 8:
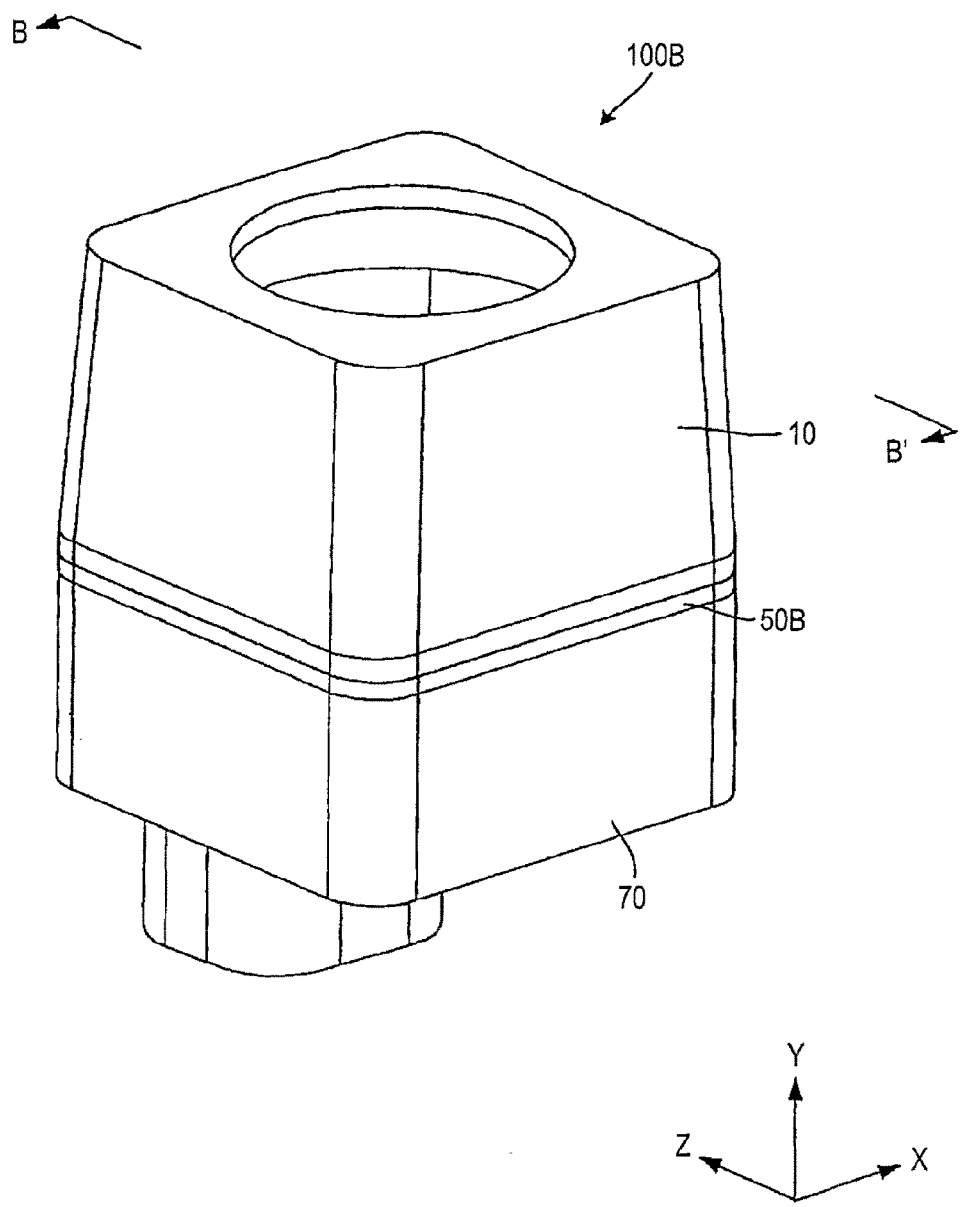
FIG. 8 shows an external perspective view of the solid-state imaging apparatus of the second embodiment of the invention.
Figure 9:
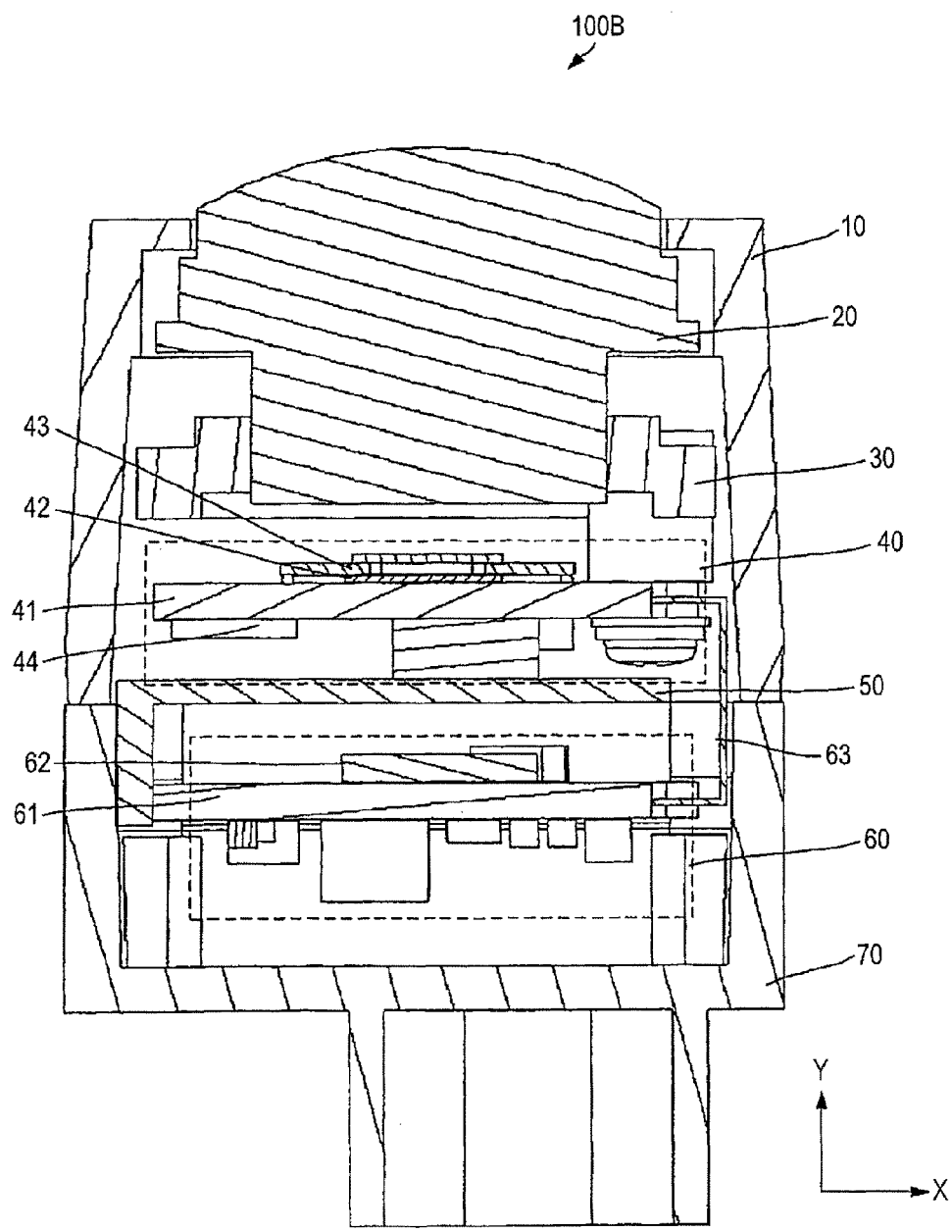
FIG. 9 shows a B-B' sectional view of the solid-state imaging apparatus of the second embodiment of the invention in which components are combined together.

As compared with the case where the shielding section 50 is not disposed, it will be understood that the heat dissipation efficiency in the case where the shielding section 50 is disposed is more excellent. Furthermore, it will be understood that, in the case where the shielding section 50 is disposed, the heat dissipation efficiency in the case where the second case 70 is made of a metal such as aluminum is more excellent than that in the case where the second case is made of a resin, Second Embodiment FIG. 7 shows an exploded perspective view of an on-vehicle camera of the embodiment. FIG. 8 shows an external perspective view of a state where the solid-state imaging apparatus of the embodiment is combined. FIG. 9 shows a B-B' sectional view of the solid-state imaging apparatus of the embodiment in which components are combined together.

The on-vehicle camera 100B shown in FIG. 7 has a shielding section 50B in place of the shielding section 50. In FIG. 7, description of the configurations which are similar to those of the on-vehicle camera 100 shown in FIG. 1 will be omitted.

The shielding section 50B has a shape in which end portions 51 are bent so as to extend along the inner wall of the second case 70. The end portions 51 have a spring property, and are in contact with the inner wall of the second case 70. Namely, the end portions 51 elastically butt against the second case 70. According to the configuration, the water-proof property and the dust-proof property can be ensured without disposing sealing packings in the first case 10 and the second case 70, respectively. In the embodiment, the shape in which the both end portions 51 are bent is employed. However, a shape in which only one end portion is bent may be employed.

In a similar manner as the shielding section 50, the shielding section 50B is thermally in contact with the electronic components placed on the second surface of the imaging module 40, such as the SiP 44, and those placed on the first surface of the power supply module 60, such as the power supply IC 62. In a similar manner as the shielding section 50, the shielding section 50B is configured by a material such as a metal such as a copper alloy, a graphite sheet, a resin having a high thermally conductive property, or the like. When the on-vehicle camera 100 is combined, the shielding section 50B is thermally in contact with the second case 70, whereby heat is dissipated to the outside of the on-vehicle camera 100 through the second case 70. The shielding section 50B which is made of a resin is mixed with a metal filler so as to further improve the heat dissipation property.

Moreover, the shielding section 50B is placed so that the power supply module 60 is covered by the bent shape. Electromagnetic waves which are generated by electronic components on the power supply board 61, such as the power supply IC 62 are blocked by the shielding section 50B. According to the configuration, it is possible to prevent the electronic components in the imaging module 40, such as the sensor 42 and the SiP 44 from malfunctioning.

Hereinafter, a method of producing the solid-state imaging apparatus 100B in the case where ultrasonic welding is performed will be described.

First, the sensor 42, the SiP 44 which processes the output signal from the sensor 42, and the like are placed on the MCM board 41. Then, the power supply IC 62 is placed on the power supply board 61. Between the MCM board 41 and the power supply board 61, then, the shielding section 50B is placed so as to cover the power supply board 61. Then, the MCM board 41 and the power supply board 61 are housed in the case (the first case 10 and the second case 70). At this time, the MCM board 41 is fastened to the lens bracket 30 by screws, and the shielding section 50B and the power supply board 61 are placed in this sequence. Then, the end portions 51 of the shielding section 50B and the case are ultrasonic welded together.

This eliminates the necessity of using fastening members in the assembling of the solid-state imaging apparatus 100B. Therefore, the assembling is facilitated. Moreover, a space for a fastening portion (boss) is not necessary, and hence the solid-state imaging apparatus 100B can be further miniaturized.

When the shielding section 50B in the embodiment is provided, the electromagnetic shielding and the thermal shielding can be performed by one component, and the number of components can be reduced.

Although the invention has been described in detail and with reference to the specific embodiments, it is obvious to those skilled in the art that various changes and modifications can be made without departing from the spirit and scope of the invention.

The invention is useful in a solid-state imaging apparatus, camera unit, or the like in which heat can be efficiently dissipated from a heat generating source that generates a large amount of heat.

What is claimed is:

1. A solid-state imaging apparatus including:
   a first board on which a solid-state imaging element, and a signal processing circuit that processes an output signal from the solid-state imaging element are mounted;
   a second board on which a power supplying circuit is mounted, the power supplying circuit being configured to supply electric power to the signal processing circuit;
   an electromagnetic shielding and heat dissipation plate which is placed between the first board and the second board to cover the power supplying circuit, and which has an electrically conductive property and a thermally conductive property; and
   a case which houses the first board and the second board, wherein:
   the electromagnetic shielding and heat dissipation plate covers a side surface of the second board,
   the electromagnetic shielding and heat dissipation plate is thermally in contact with the signal processing circuit mounted on the first board or the power supplying circuit mounted on the second board, and
   the electromagnetic shielding and heat dissipation plate is thermally in contact with the case.

2. The solid-state imaging apparatus according to claim 1, wherein:
   the case is configured by a first case which houses the first board, and a second case which houses the second board, and
   the electromagnetic shielding and heat dissipation plate is sandwiched between the first case and the second case.

3. The solid-state imaging apparatus according to claim 1, wherein an end portion of the electromagnetic shielding and heat dissipation plate elastically butts against the case.

4. A method of producing a solid-state imaging apparatus according to claim 3, including the steps:
   mounting the solid-state imaging element, and the signal processing circuit that processes the output signal from the solid-state imaging element, on the first board;
   mounting the power supplying circuit on the second board, the power supplying circuit being configured to supply electric power to the signal processing circuit;
   placing the electromagnetic shielding and heat dissipation plate which has an electrically conductive property and a thermally conductive property, between the first board and the second board, to cover the power supplying circuit;
   housing the first board and the second board in the case; and
   ultrasonic welding an end portion of the electromagnetic shielding and heat dissipation plate with the case.

5. The solid-state imaging apparatus according to claim 1, wherein:
   a lens unit which holds a lens is fixed to the first board, and in contact with the case, and
   a coefficient of thermal conductivity of the electromagnetic shielding and heat dissipation plate is higher than a coefficient of thermal conductivity of the lens unit.

6. The solid-state imaging apparatus according to claim 1, wherein the electromagnetic shielding and heat dissipation plate is formed by a metal plate.

7. The solid-state imaging apparatus according to claim 1, wherein the electromagnetic shielding and heat dissipation plate is formed by a graphite sheet.

8. The solid-state imaging apparatus according to claim 1, wherein the signal processing circuit includes a digital signal processor.

9. The solid-state imaging apparatus according to claim 1, wherein the electromagnetic shielding and heat dissipation plate is in direct contact with the case.

10. The solid-state imaging apparatus according to claim 1, wherein the power supplying circuit is electromagnetically shielded by the electromagnetic shielding and heat dissipation plate.

11. The solid-state imaging apparatus according to claim 1, wherein the electromagnetic shielding and heat dissipation plate is concave toward the first board.

12. The solid-state imaging apparatus according to claim 1, wherein the second board is disposed within a convex portion of the electromagnetic shielding and heat dissipation plate.

13. The solid-state imaging apparatus according to claim 1, wherein:
   the electromagnetic shielding and heat dissipation plate includes a through-hole, and
   a wire connecting the first board and the second board passes through the through-hole.

* * * * *